(12) United States Patent
Wike et al.

(10) Patent No.: US 12,255,685 B2
(45) Date of Patent: Mar. 18, 2025

(54) POWER AMPLIFIER SYSTEM WITH AN INTERNAL OPTICAL COMMUNICATION LINK

(71) Applicant: Empower RF Systems, Inc., Inglewood, CA (US)

(72) Inventors: Donald M. Wike, Corona, CA (US); Michael Berman, Los Angeles, CA (US); Darren Miles, Anaheim, CA (US); Paulo Correa, Dana Point, CA (US); Leonid Mogilevsky, Encino, CA (US); Marc Obbad, Escondido, CA (US)

(73) Assignee: EMPOWER RF SYSTEMS, INC., Inglewood, CA (US)

( * ) Notice: Subject to any disclaimer, the term of this patent is extended or adjusted under 35 U.S.C. 154(b) by 534 days.

(21) Appl. No.: 17/466,541

(22) Filed: Sep. 3, 2021

(65) Prior Publication Data

US 2022/0103255 A1 Mar. 31, 2022

Related U.S. Application Data

(63) Continuation of application No. 15/931,166, filed on May 13, 2020, now Pat. No. 11,115,121.
(Continued)

(51) Int. Cl.
*H04B 10/00* (2013.01)
*H04B 10/25* (2013.01)
(Continued)

(52) U.S. Cl.
CPC ..... *H04B 10/2507* (2013.01); *H04B 10/2581* (2013.01); *H04B 10/2589* (2020.05)

(58) Field of Classification Search
CPC .............................. H04B 10/80; H04B 10/801
See application file for complete search history.

(56) References Cited

U.S. PATENT DOCUMENTS

| 4,963,833 | A | 10/1990 | Mountz |
| 7,657,041 | B1 | 2/2010 | Ko |
| (Continued) | | | |

FOREIGN PATENT DOCUMENTS

EP 2360491 A1 8/2011

OTHER PUBLICATIONS

Notification of International Search Report and Written Opinion dated Aug. 19, 2020 received in related PCT Application No. PCT/US20/32815 ( pages).

*Primary Examiner* — Daniel G Dobson
(74) *Attorney, Agent, or Firm* — Wilmer Cutler Pickering Hale and Dorr LLP

(57) ABSTRACT

Techniques for implementing an internal optical communication link in a power amplifier system are disclosed. In one embodiment, the techniques may be realized as a power amplifier system that includes a panel, an optical link, and a controller. The panel includes a plurality of signal endpoints and a first optical interface, the first optical interface being coupled to each of the plurality of signal endpoints. The optical link is coupled to the first optical interface. The controller is configured to manage operation of the power amplifier system and is coupled to the optical link via a second optical interface. The controller communicates with each of the plurality of signal endpoints over the optical link.

20 Claims, 21 Drawing Sheets

Related U.S. Application Data

(60) Provisional application No. 62/856,532, filed on Jun. 3, 2019, provisional application No. 62/847,751, filed on May 14, 2019.

(51) Int. Cl.
*H04B 10/2507* (2013.01)
*H04B 10/2581* (2013.01)
*H04J 14/00* (2006.01)

(56) References Cited

U.S. PATENT DOCUMENTS

| | | |
|---|---|---|
| 8,736,365 B2 | 5/2014 | Correa et al. |
| 9,093,731 B2 | 7/2015 | Correa et al. |
| 9,590,832 B1 | 3/2017 | Zhang et al. |
| 11,115,121 B2 | 9/2021 | Wike et al. |
| 2006/0111047 A1 | 5/2006 | Louberg et al. |
| 2010/0040325 A1 | 2/2010 | Tigli et al. |
| 2014/0232469 A1* | 8/2014 | Correa ............... H03F 3/211 330/295 |
| 2015/0055663 A1* | 2/2015 | Quinn ............... H04B 10/801 398/43 |
| 2015/0080054 A1 | 3/2015 | Kim et al. |
| 2015/0146773 A1 | 5/2015 | Ma et al. |

\* cited by examiner

United States Patent

POWER AMPLIFIER SYSTEM WITH AN INTERNAL OPTICAL COMMUNICATION LINK

RELATED APPLICATIONS

This application is a continuation of U.S. patent application Ser. No. 15/931,166, filed May 13, 2020, which claims priority under 35 U.S.C. § 119 (e) to U.S. Provisional Patent Application No. 62/847,751, entitled "Power amplifier system with an optical communication link," filed May 14, 2019, and U.S. Provisional Patent Application No. 62/856,532, entitled "Power amplifier system with an internal optical communication link," filed Jun. 3, 2019, each of which is incorporated by reference herein in its entirety.

FIELD OF THE DISCLOSURE

The present disclosure generally relates to power amplifiers and, more particularly, to techniques for implementing an internal optical communication link in a power amplifier system.

BACKGROUND OF THE DISCLOSURE

Power amplifiers may be used in a wide variety of applications, from communications to electronic warfare systems. The suitability of a given power amplifier for a particular application may be impacted by various physical and performance characteristics of the power amplifier, such as reliability, performance, availability, size, and weight. For example, these characteristics may be determinative of whether a given power amplifier system can be deployed in the field.

Thus, it may be understood that there may be a need for power amplifier systems with improved physical and performance characteristics.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1A:
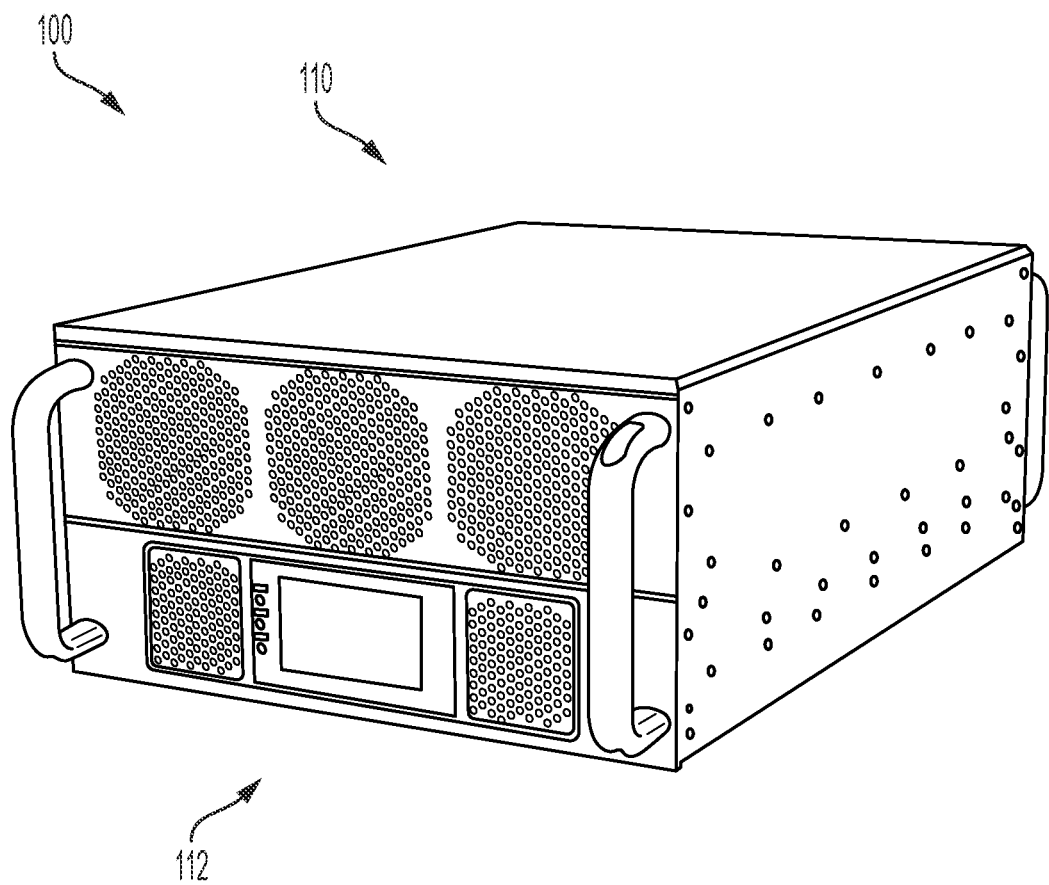
FIGS. 1A-1C are simplified diagrams of a power amplifier system according to some embodiments.
Figure 1B:
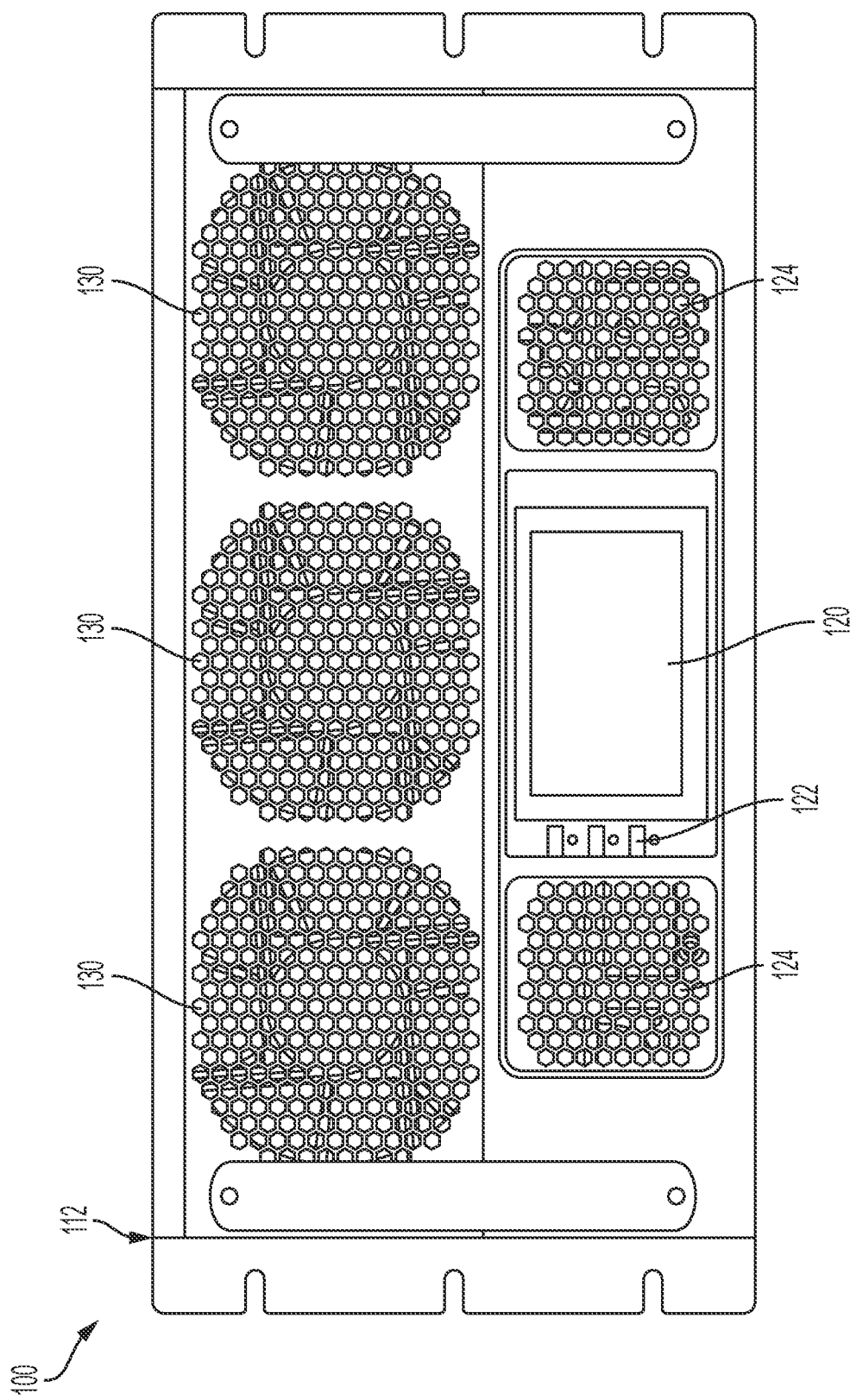
Figure 1C:
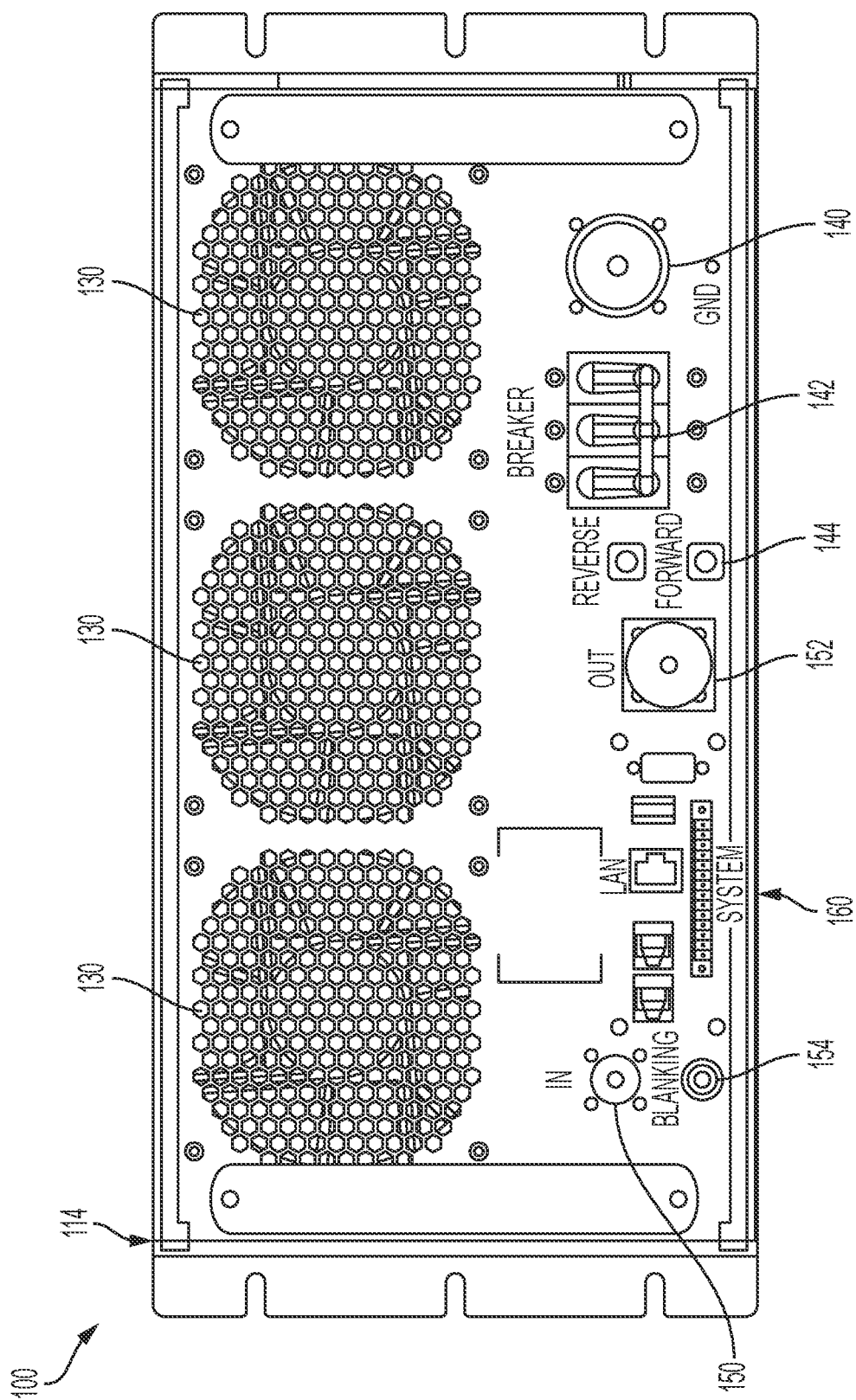

FIGS. 1A-1C are simplified diagrams of a power amplifier system 100 according to some embodiments. FIG. 1A shows a perspective view of power amplifier system 100, FIG. 1B shows a front planar view of power amplifier system 100, and FIG. 1C shows a rear planar view of power amplifier system 100.

As illustrated in FIG. 1A, power amplifier system 100 includes an enclosure 110 that houses various components of power amplifier system 100. Enclosure 110 may come in various form factors. For example, enclosure 110 may be sized to allow power amplifier system 100 to be mounted to a standard rack.

A front panel 112 of enclosure 110 may include various interfaces, indicators, connectors, electronic modules, and the like. As illustrated in FIG. 1B, front panel 112 includes a display panel 120 and a variety of indicators (e.g., LED indicators) 122. Other electronic components 124 are mounted to front panel 112. In some embodiments, one or more cooling fans 130 may be mounted to front panel 112.

Referring to FIG. 1C, a rear panel 114 of enclosure 110 may include a power connector 140 and a circuit breaker 142, as well as various indicators (e.g., LED indicators) 144. Rear panel 114 may further include an input connector 150, an output connector 152, and a blanking signal connector 154. Input connector 150 may be used to receive an input or stimulus signal, output connector 152 may be used to output an amplified signal, and blanking signal connector 154 may be used to receive a signal that is used to disable or mute power amplifier system 100. Rear panel 114 may further include one or more input/output (I/O) interfaces 160. Examples of I/O interfaces 160 may include, but are not limited to, Ethernet connections, USB connections, serial interfaces, parallel interfaces, or the like. In some embodiments, one or more fans 130 may be mounted to rear panel 114.

Other panels of enclosure 110 (e.g., side, top, and bottom panels, not shown) may include additional interfaces, indicators, connectors, fans, switches, buttons, electronic components, and the like.

As these features suggest, a variety of information is physically transmitted throughout power amplifier system 100 during operation. For example, control signals may be received and/or transmitted from power amplifier system 100 via I/O interfaces 160. Information is displayed via display panel 120. Data signals associated with indicators 122 and 144, electronic components 124, and fans 130 are also present. Additional information may be circulated within enclosure 110.

Given the wide range of information that is transmitted and processed throughout power amplifier system 100 during operation, it is desirable for the information to be transmitted reliably. For example, it is desirable to transmit information in a manner that is robust against electromagnetic interference (EMI) and other sources of noise that can adversely impact the reliability of electronic signal communications. Moreover, it is desirable for information to be transmitted with low latency.

One approach to carrying information throughout power amplifier system 100 is to use electrical cabling. However, the use of electrical cabling can result in some challenges. For example, electrical cabling is generally susceptible to EMI. Therefore, implementing electrical cabling in a manner that is robust to EMI may introduce additional complexity into the design of power amplifier system 100. This additional complexity can increase the incidence of problems caused by human error (e.g., poor workmanship) and can make operating, maintaining, and repairing power amplifier system 100 more difficult. Furthermore, electrical cables can introduce undesirable latency and limit the performance of power amplifier 100. In addition, electrical cables can be heavy, particularly in aggregate when each cable carries a different signal (as opposed to multiple signals being sent over a shared link).

Accordingly, it is desirable to provide an improved mechanism for communicating information within power amplifier system 100.

Figure 2A:
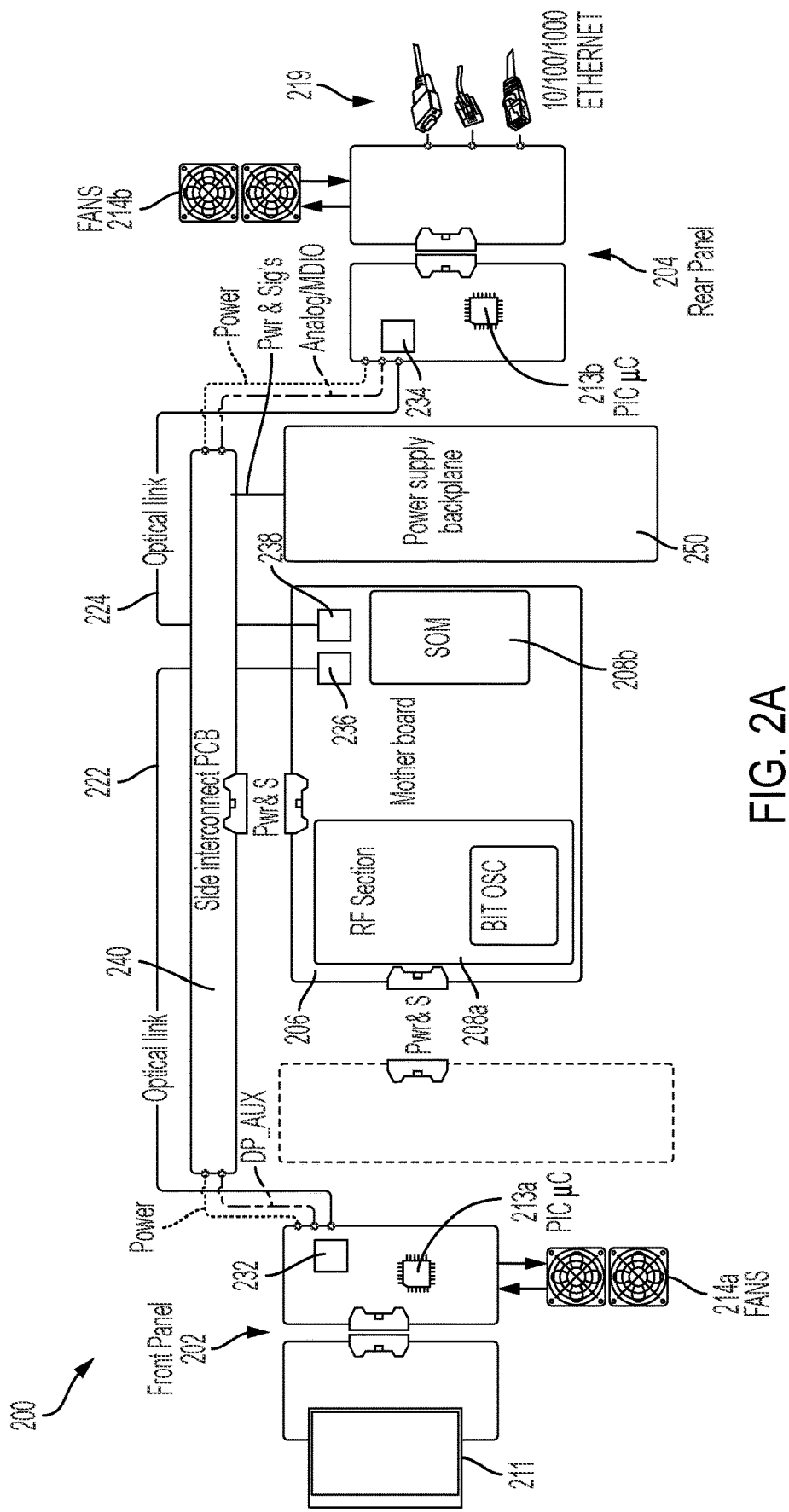
FIG. 2A-2D are simplified diagrams of a power amplifier system with an internal optical communication link according to some embodiments.
Figure 2B:
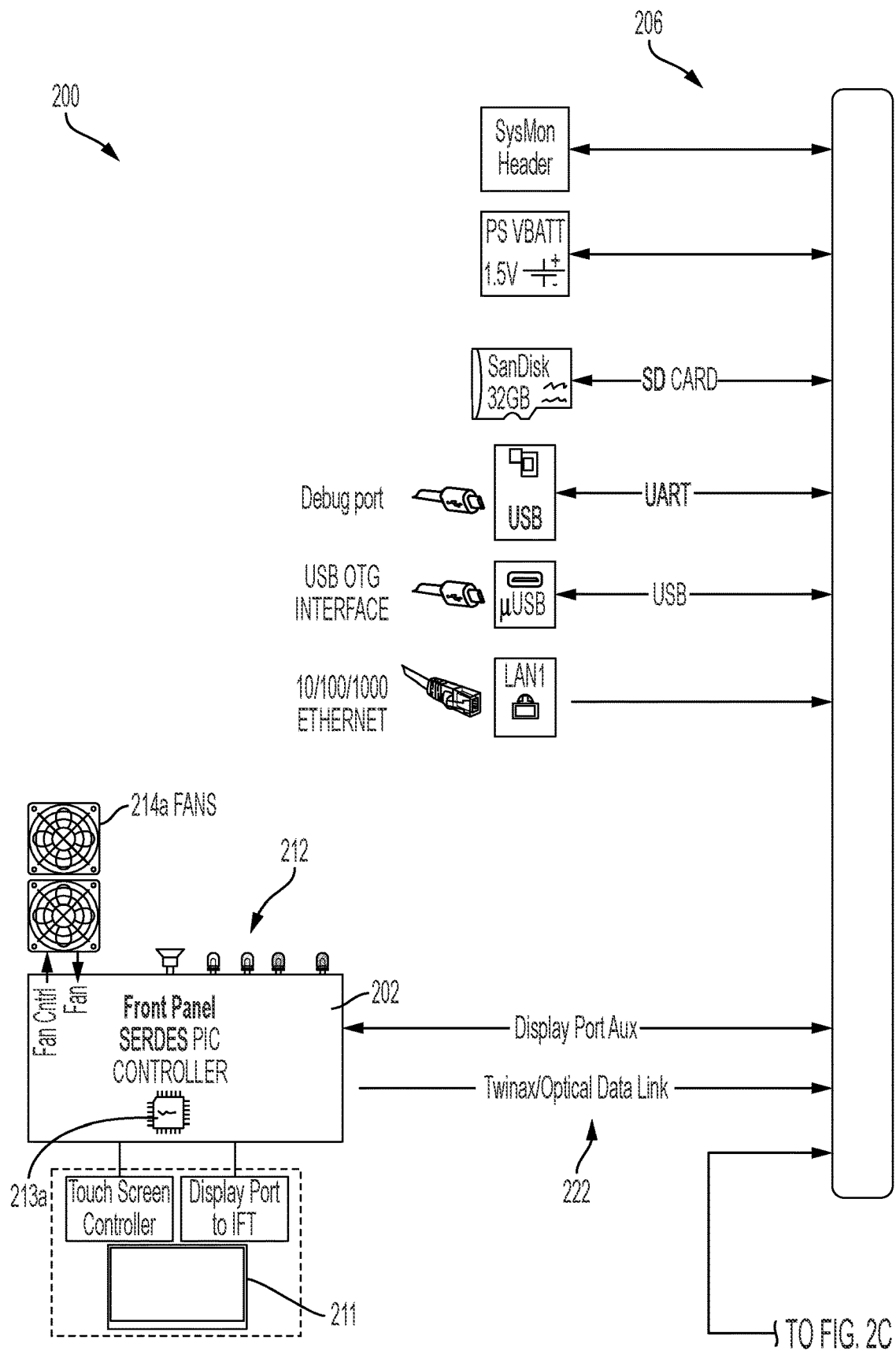
Figure 2C:
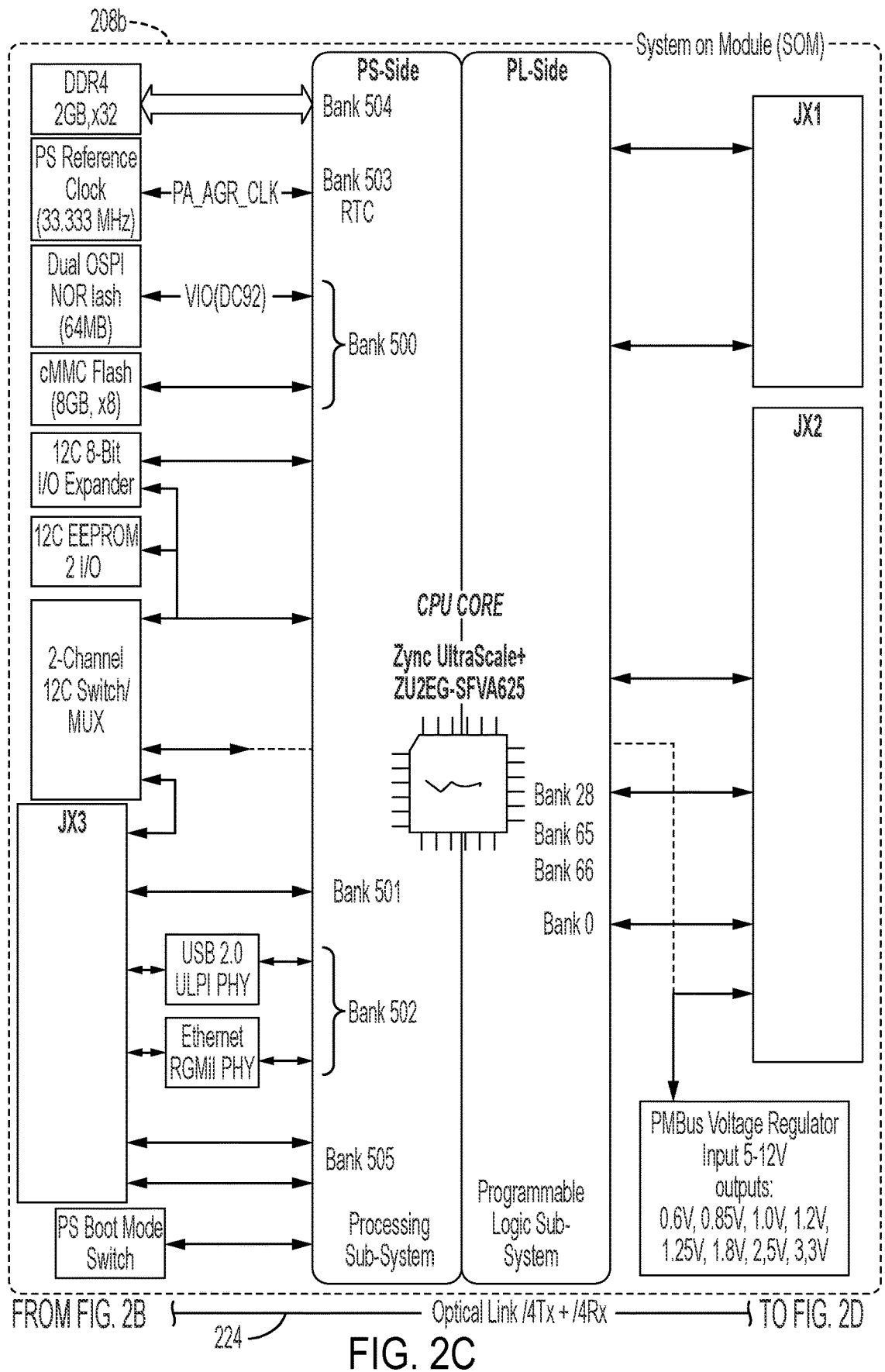
Figure 2D:
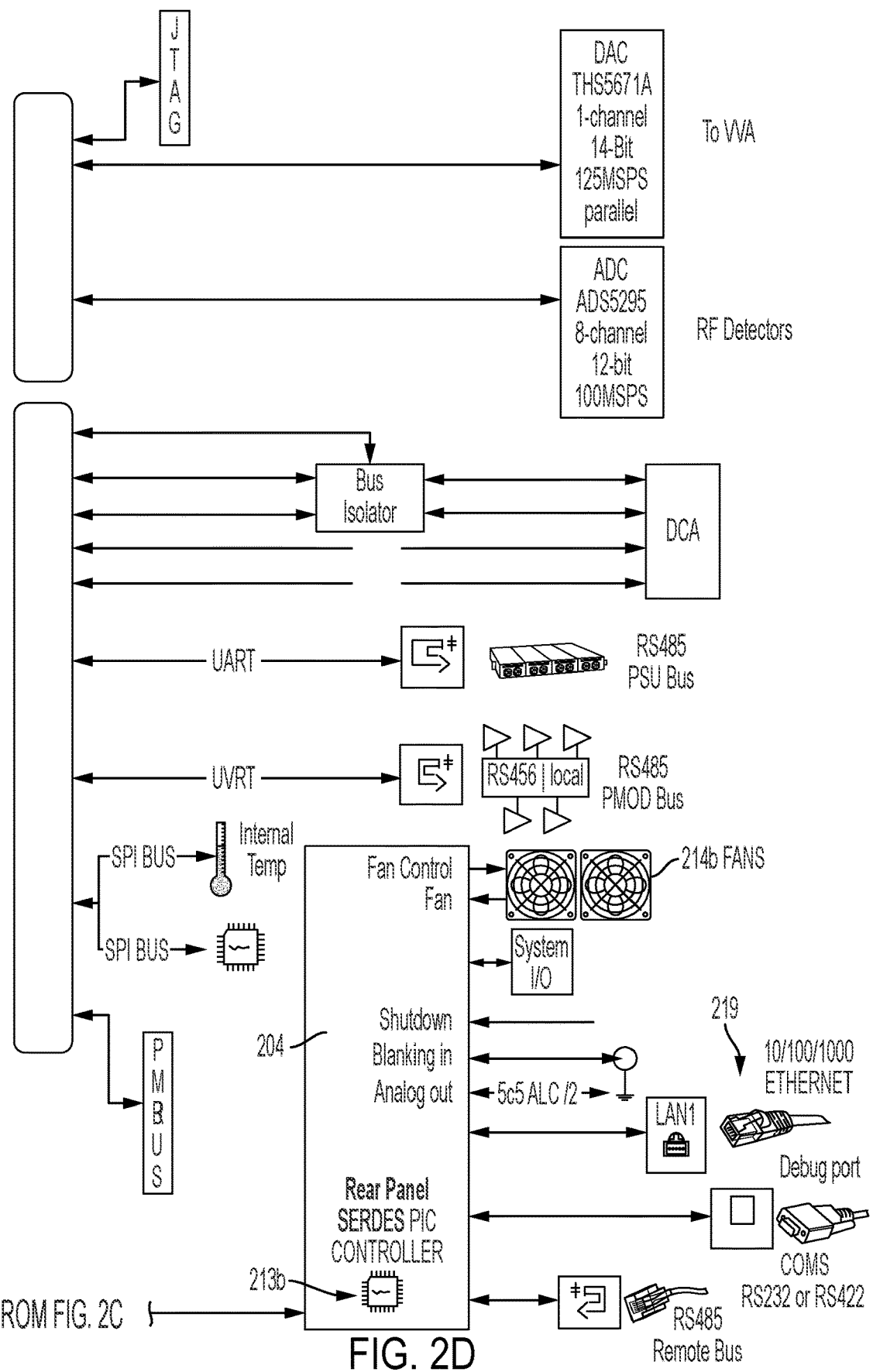

FIGS. 2A-2D are simplified diagrams of a power amplifier system 200 with an internal optical communication link according to some embodiments. FIG. 2A shows a block diagram view of power amplifier system 200 and FIGS. 2B-2D show a schematic view of power amplifier system 200. In some embodiments, the components of power amplifier system 200 may generally correspond to the components of power amplifier system 100. For example, power amplifier system 200 includes a front panel 202, which generally corresponds to front panel 112, and a rear panel 204, which generally corresponds to rear panel 114. Power amplifier system 200 further includes a controller (e.g., a motherboard) 206. In some embodiments, controller 206 may be configured to manage the operation of power amplifier system 200 and various sub-components thereof. For example, controller 206 may include an amplifier circuit (e.g., an RF section) 208a and one or more processors (e.g., a system on module (SOM)) 208b. Controller 206 may carry out a variety of management tasks associated with managing the operation of power amplifier system 200, including but not limited to receiving and storing user parameters, selecting a mode of operation of power amplifier system 200, implementing feedback loops to control an output level of the amplifier circuit (e.g., automatic gain control or automatic power control), blanking or muting an output of the amplifier circuit, collecting data associated with power amplifier system 200, providing instructions to components of power amplifier system 200, or the like.

In some embodiments, front panel 202 and rear panel 204 may each include a plurality of signal endpoints 211-219. Signal endpoints 211-219 generally correspond to devices, modules, or other components of power amplifier system 200 that send and/or receive information. Examples of signal endpoints 211-219 can include, but are not limited to, input/output (I/O) interfaces, Ethernet interfaces, serial interfaces, devices that receive commands and/or control signals, devices that generate status information, display ports, status indicators (e.g., LED indicators), and the like. As illustrated in FIGS. 2A-2D, signal endpoints 211-219 can include a touch screen display (signal endpoint 211), audio and/or visual indicators (signal endpoint 212), peripheral interface controllers (PICs) (signal endpoint 213a and 213b), fans (signal endpoints 214a and 214b), and communication interfaces (signal endpoint 219). More generally, signal endpoints 211-219 can include virtually any component that communicates with other components of power amplifier system 200 during operation.

Power amplifier system 200 further includes an optical link 222 and an optical link 224. As illustrated in FIGS. 2A-2D, optical link 222 connects front panel 202 with controller 206, and optical link 224 connects rear panel 204 with controller 206. In this manner, optical links 222 and 224 allow controller 206 to communicate with signal endpoints 211-219.

In some embodiments, optical links 222 and 224 may connect to front panel 202, rear panel 204, and controller 206 via optical interfaces 232-238. For example, as illustrated in FIGS. 2A-2D, front panel 202 includes optical interface 232, rear panel 204 includes optical interface 234, and controller 206 incudes optical interfaces 236 and 238. Optical link 222 is coupled between optical interfaces 232 and 236, and optical link 224 is coupled between optical interfaces 234 and 238. In some embodiments, one or more of optical interfaces 232-238 may be serializer/deserializer (SerDes) interfaces. A SerDes interface converts parallel data to serial data for transmission over an optical link (e.g., optical link 222 or 224) and converts serial data received over the optical link to parallel data. In some embodiments, the SerDes interface may be configured to synchronize the transmitted and received data, for example, by recovering embedded clock signals from the transmitted data. In this manner, controller 206 can communicate with multiple endpoints on front panel 202 via a single optical link 222 and, similarly, controller 206 can communicate with multiple endpoints on rear panel 204 via a single optical link 224.

Various communication protocols, standards, and interfaces can be used to communicate via optical links 222 and 224. Examples of such protocols may include, but are not limited to, Ethernet (e.g., Gigabit Ethernet (GbE), and interfaces used to connect to Ethernet such as serial gigabit media-independent interface (SGMII), management data input/output (MDIO), and the like), DisplayPort (e.g., DP 1.2 interface and Auxiliary channel), and general communication buses (e.g., UART, SPI, and the like). Control signals (e.g., pulse-width modulation (PWM) control signals, general I/O, and the like) can also be transmitted and received via optical links 222 and 224. In some embodiments, signals may be encoded for transmission over optical links 222 and 224 using various encoding techniques (e.g., 8b/10b encoding).

In general, optical links 222 and 224 have limited susceptibility to EMI, improving the robustness of communications between controller 206 and signal endpoints 211-219 relative to electrical cabling. Moreover, optical signals generally have less latency than electrical signals, so optical links 222 and 224 may improve the performance of communications between controller 206 and signal endpoints 211-219 relative to electrical cabling. In addition, the ability to communicate with multiple endpoints over each of optical links 222 and 224 reduces the amount of wiring in power amplifier system 200, which can simplify assembly and maintenance and can reduce the incidence of workmanship-related errors.

In some embodiments, power amplifier system 200 may include electrical wiring in addition to optical links 222 and 224. To facilitate the distribution of electrical wiring, power amplifier system 200 may include an interconnect board (e.g., a side interconnect PCB) 240 connected between front panel 202, rear panel 204, and controller 206. For example, interconnect board 240 may provide a wired connection between a power supply 250 and front panel 202, rear panel 204, and/or controller 206. Interconnect 240 may also provide a backup or contingency route for controller 206 to communicate with signal endpoints 211-219. The backup or contingency route may be used, e.g., when optical links 222 and/or 224 are unavailable.

Figure 3A:
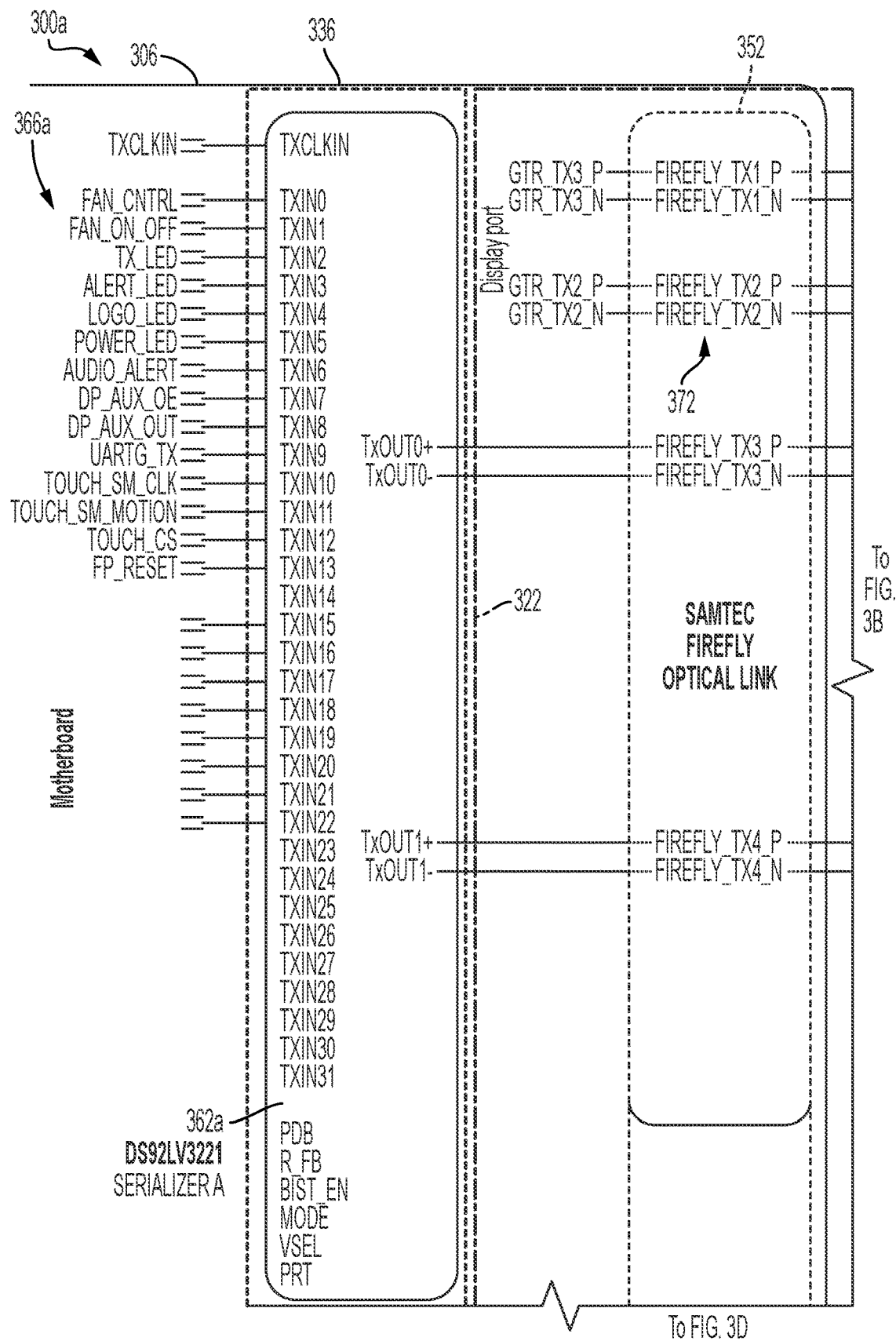
FIGS. 3A-3M are simplified diagrams of optical communication systems according to some embodiments.
Figure 3B:
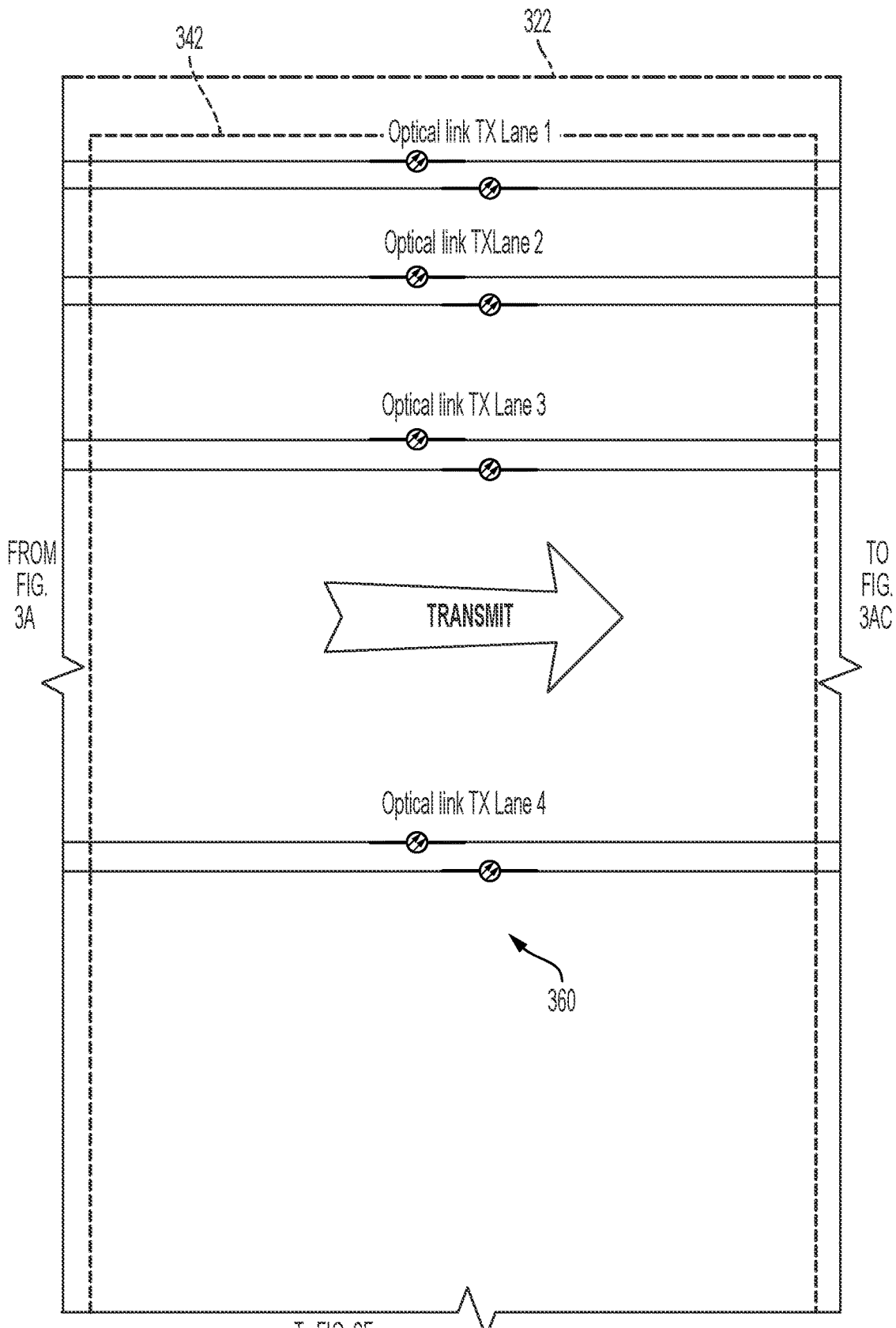
Figure 3C:
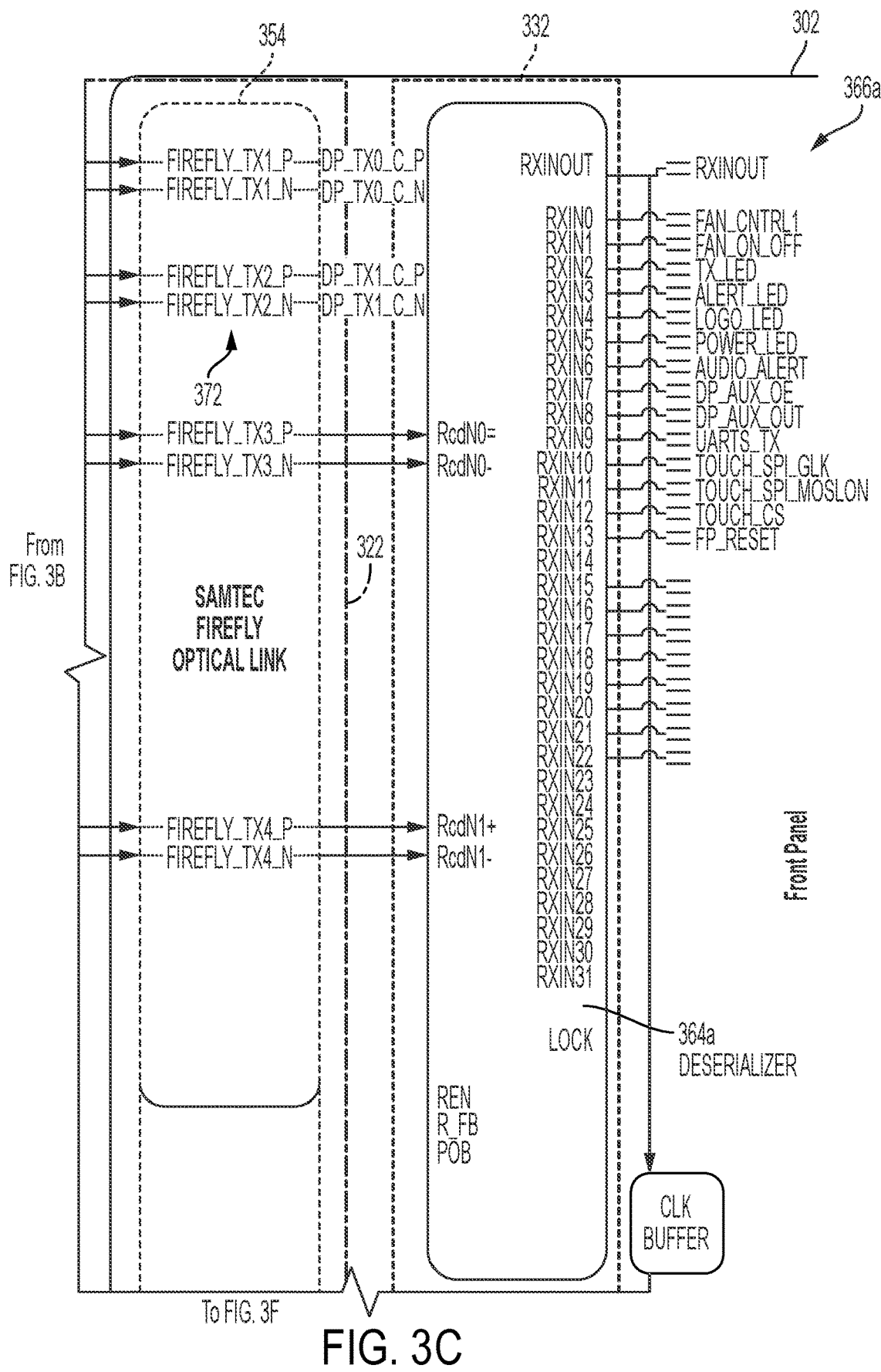
Figure 3D:
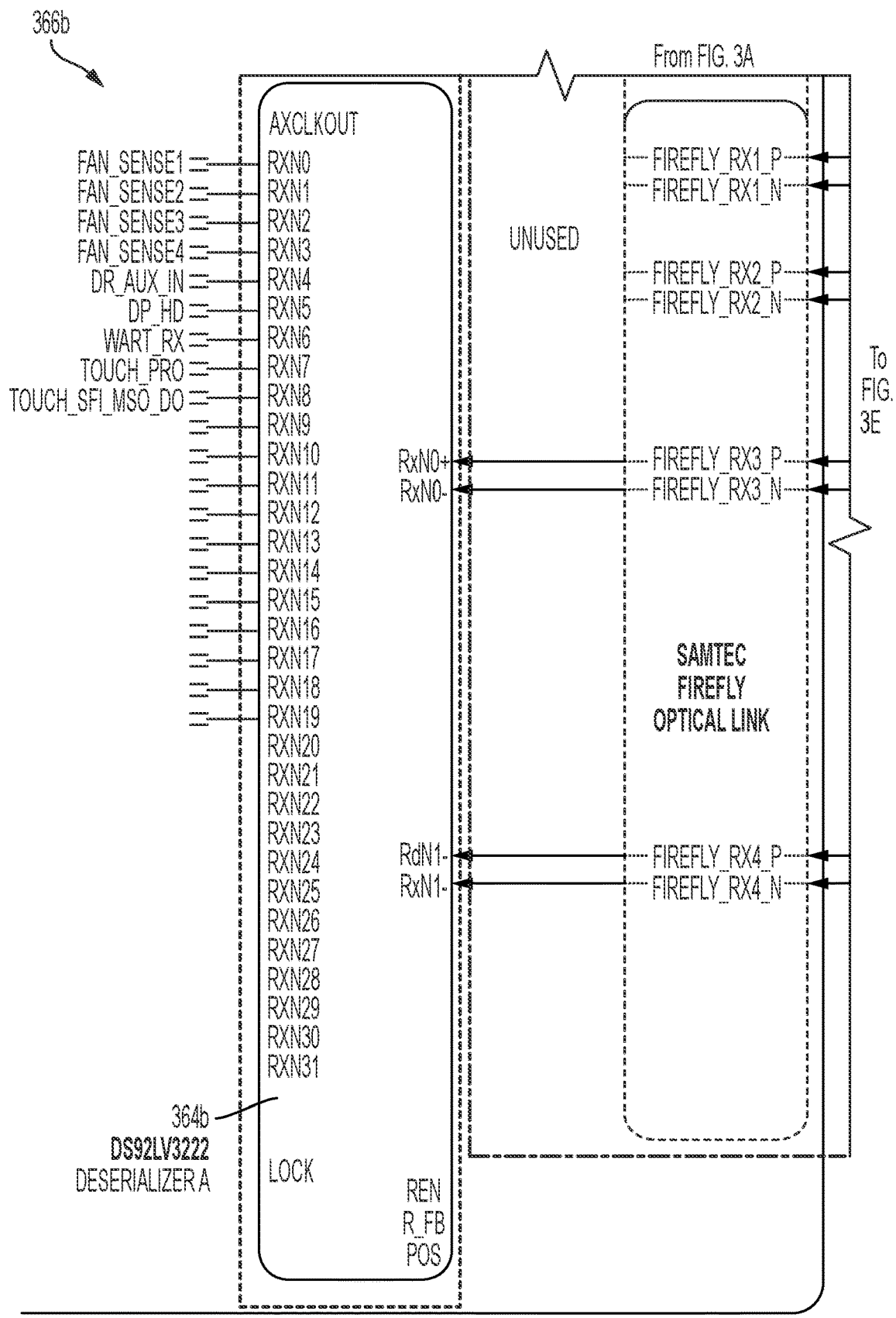
Figure 3E:
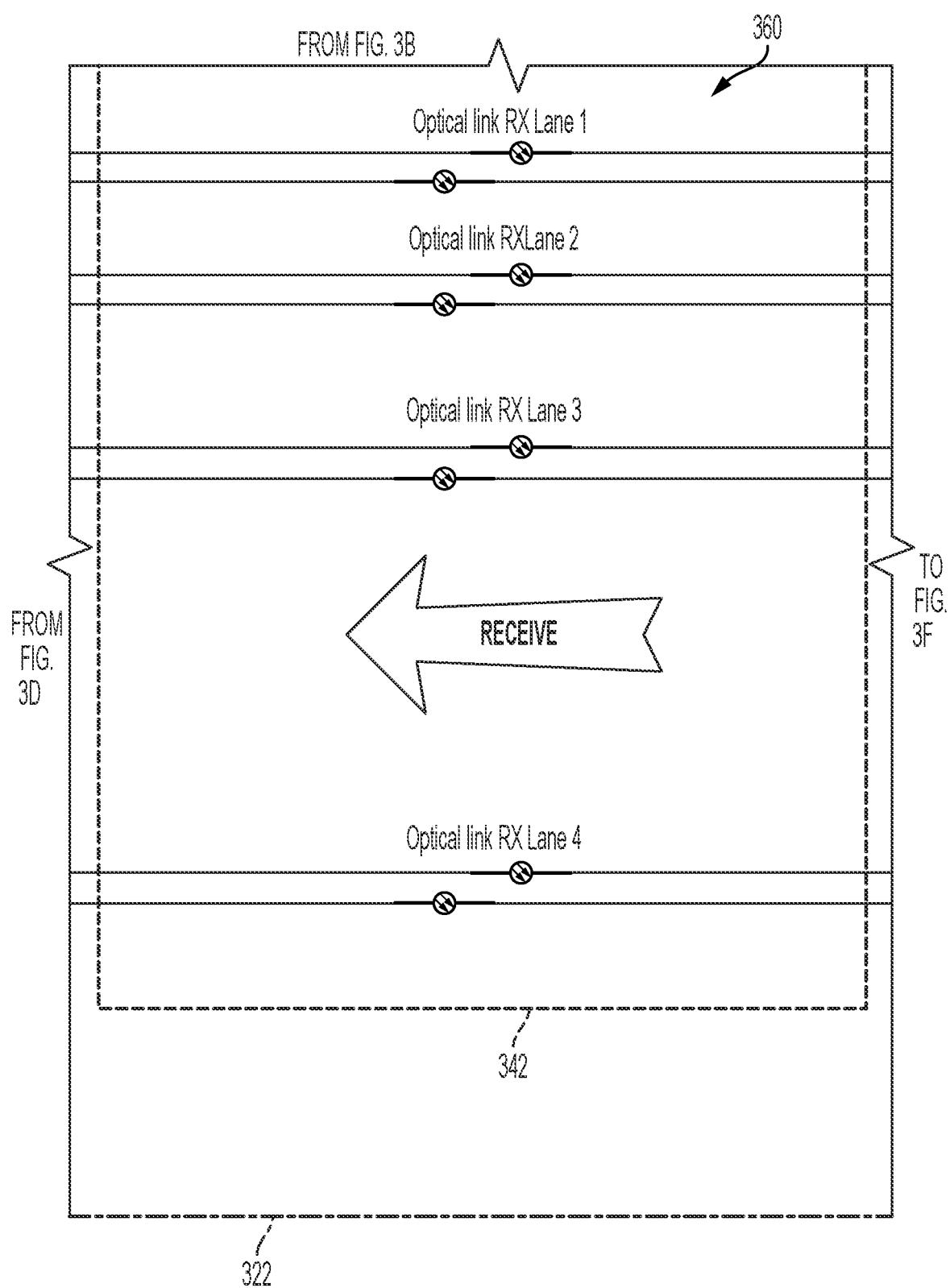
Figure 3F:
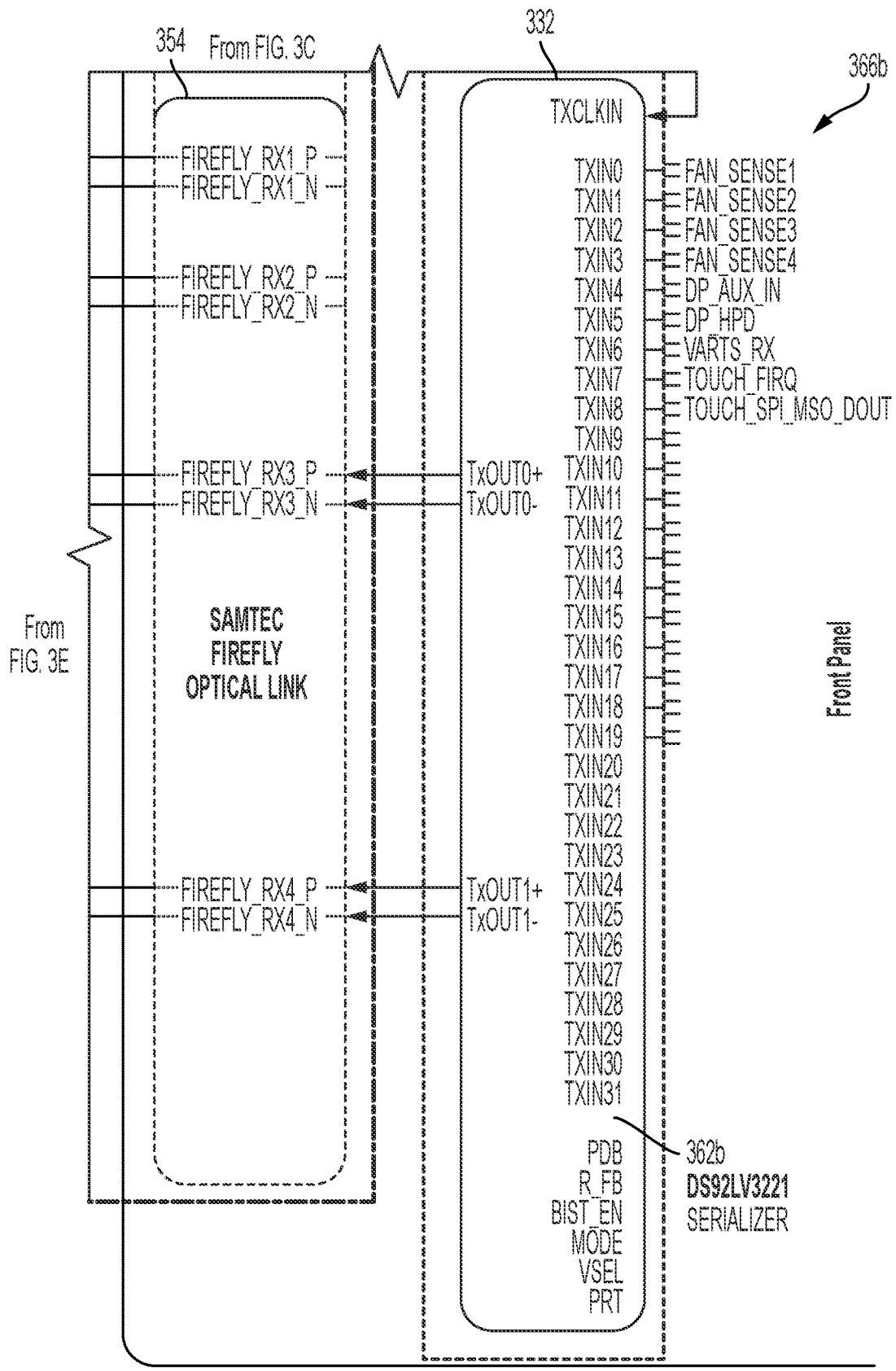
Figure 3G:
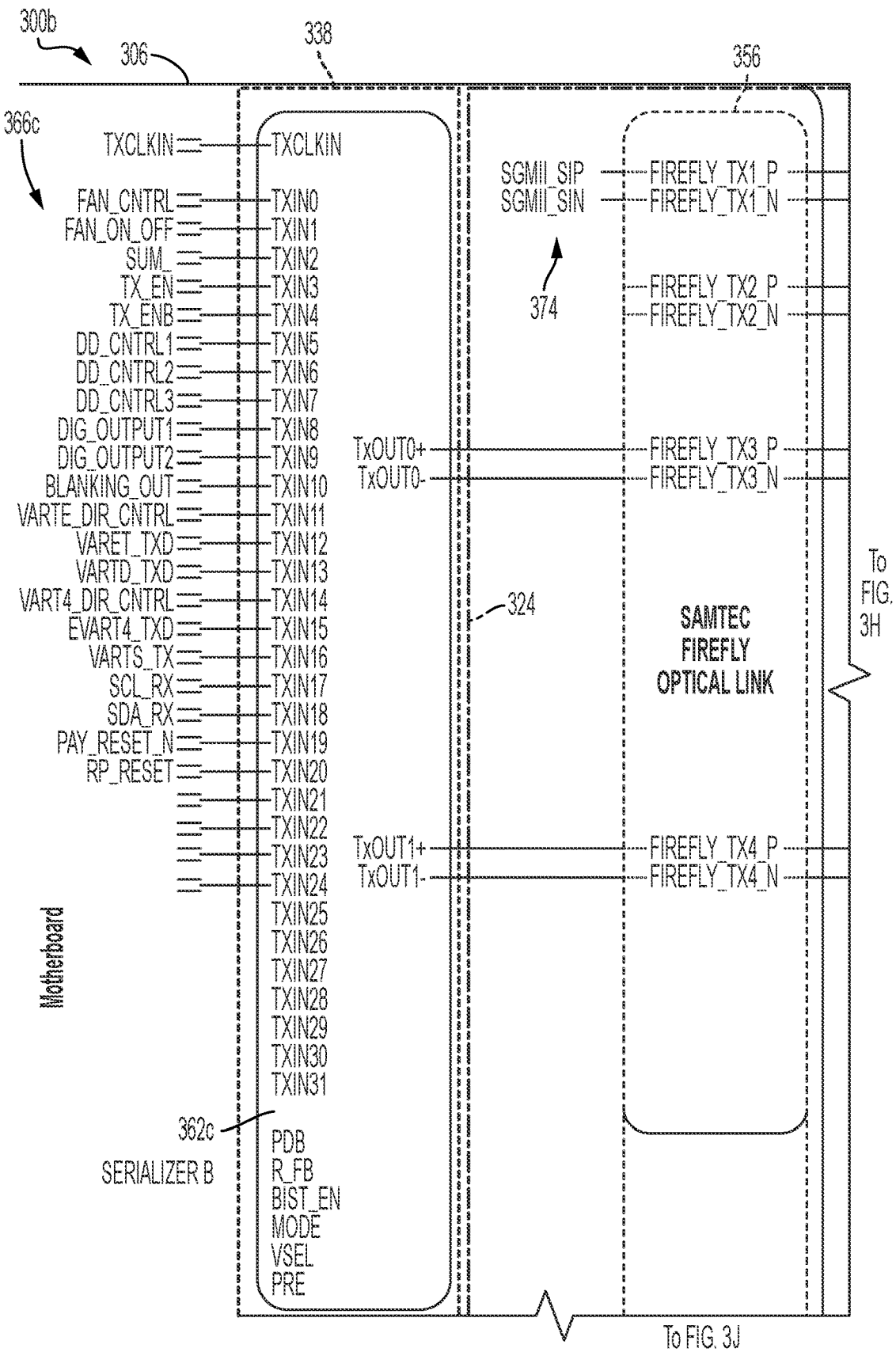
Figure 3H:
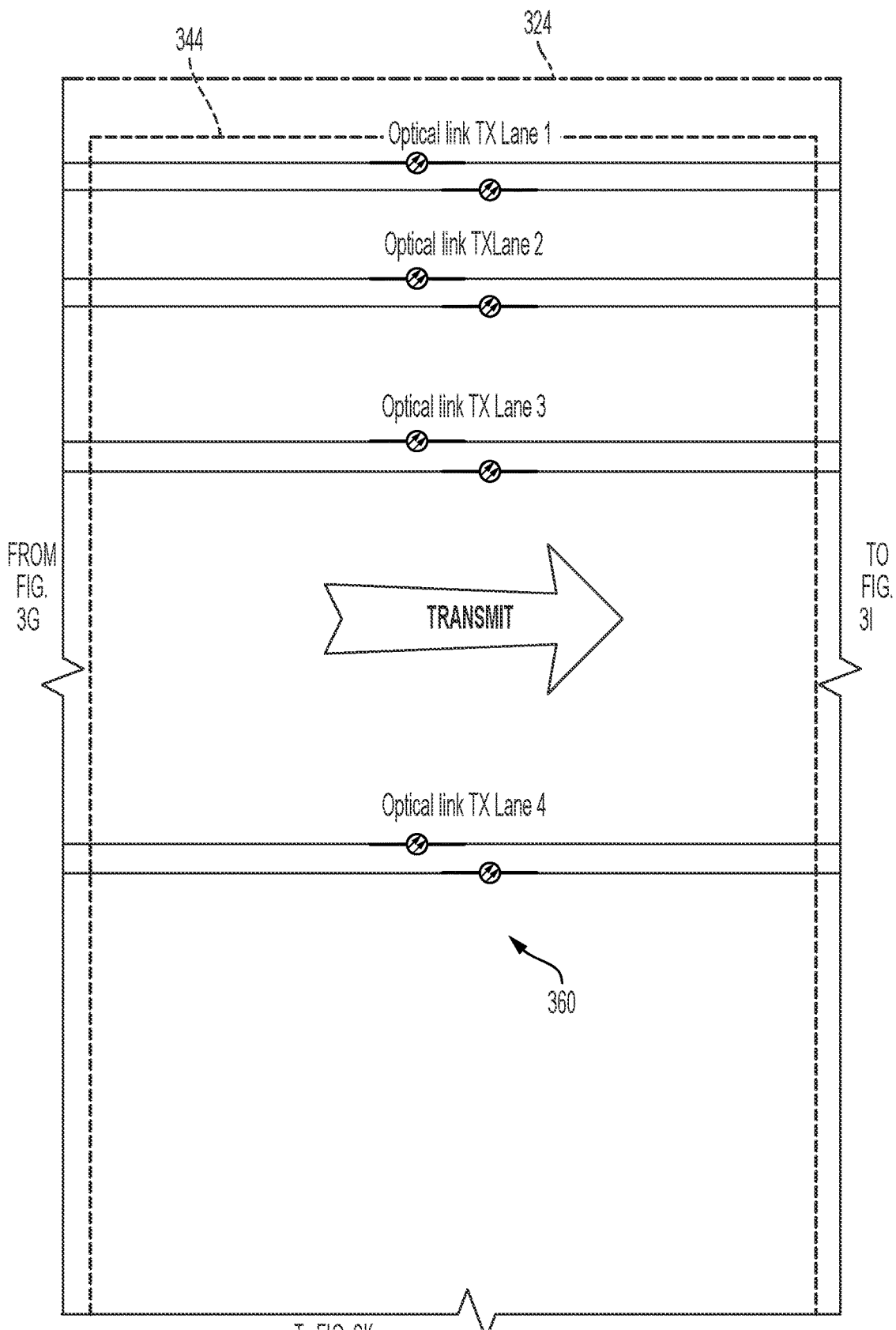
Figure 3I:
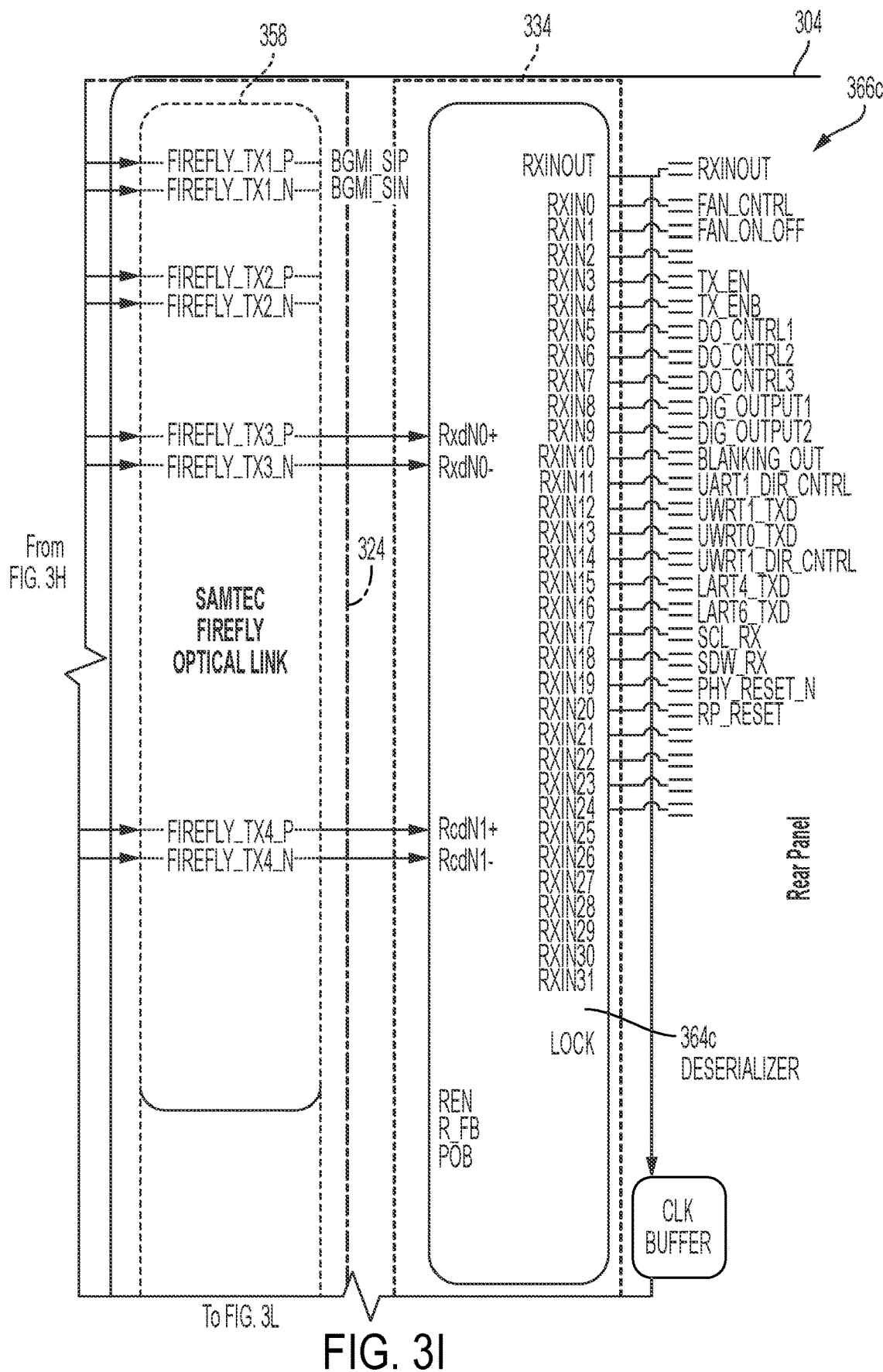
Figure 3J:
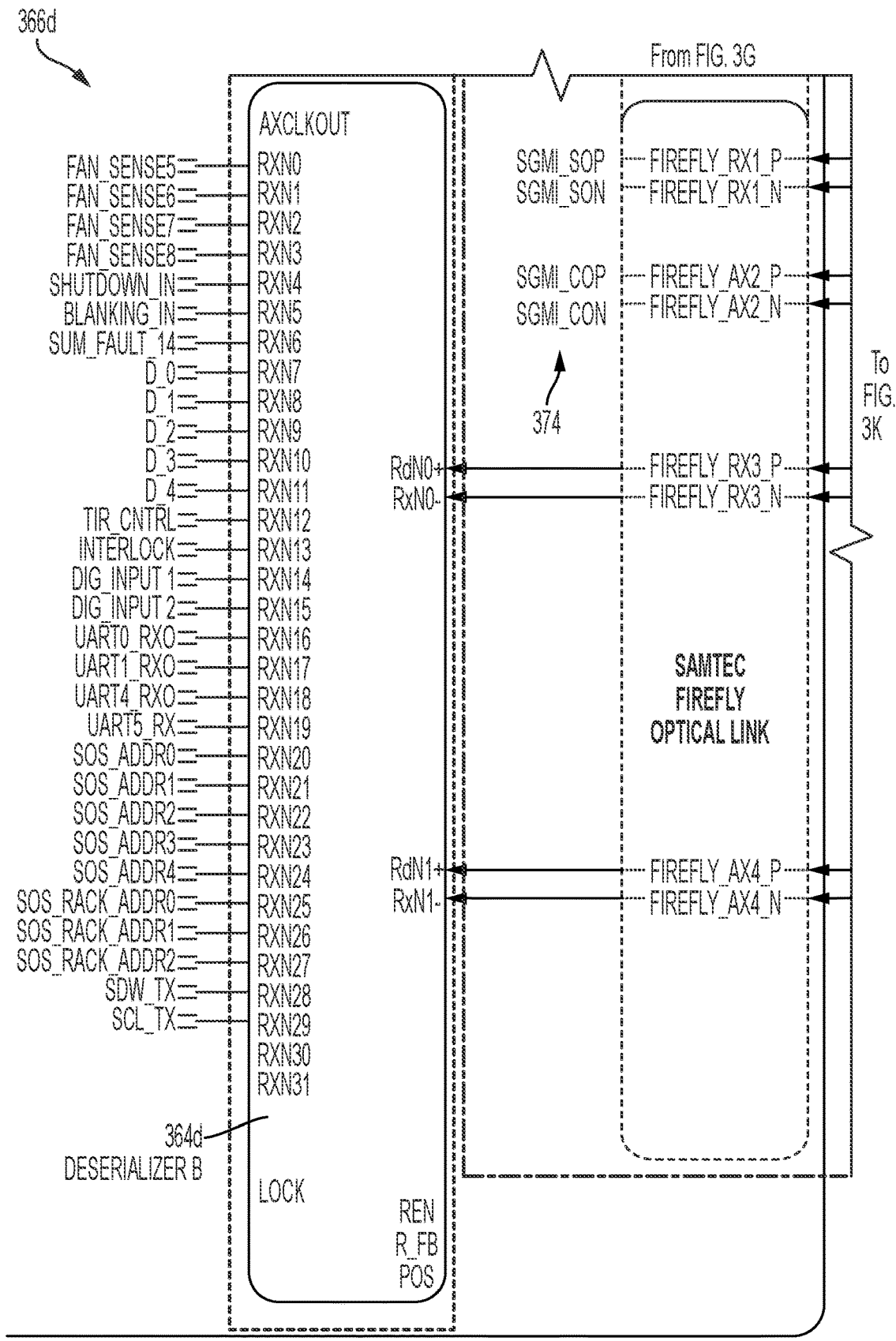
Figure 3K:
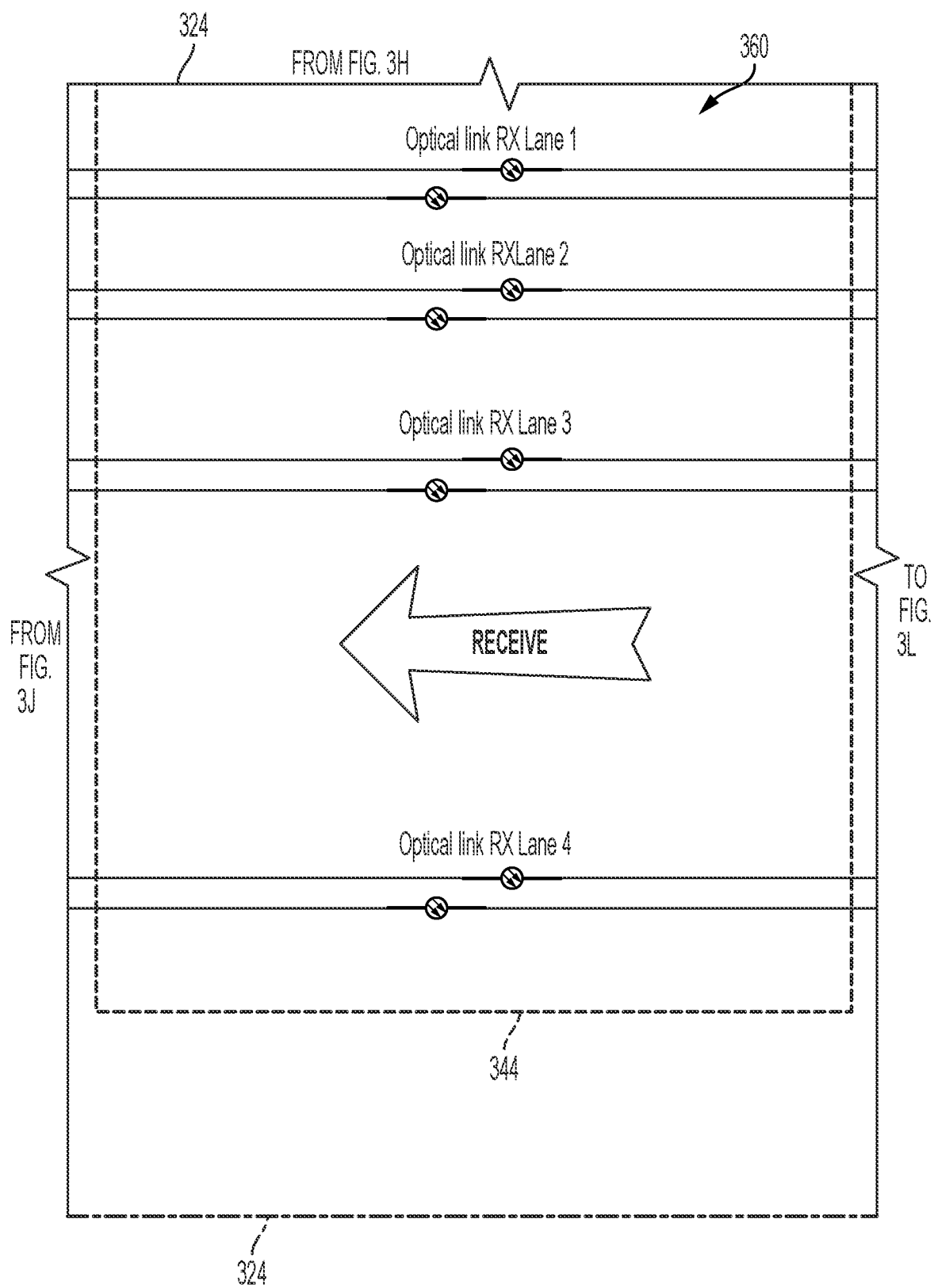
Figure 3L:
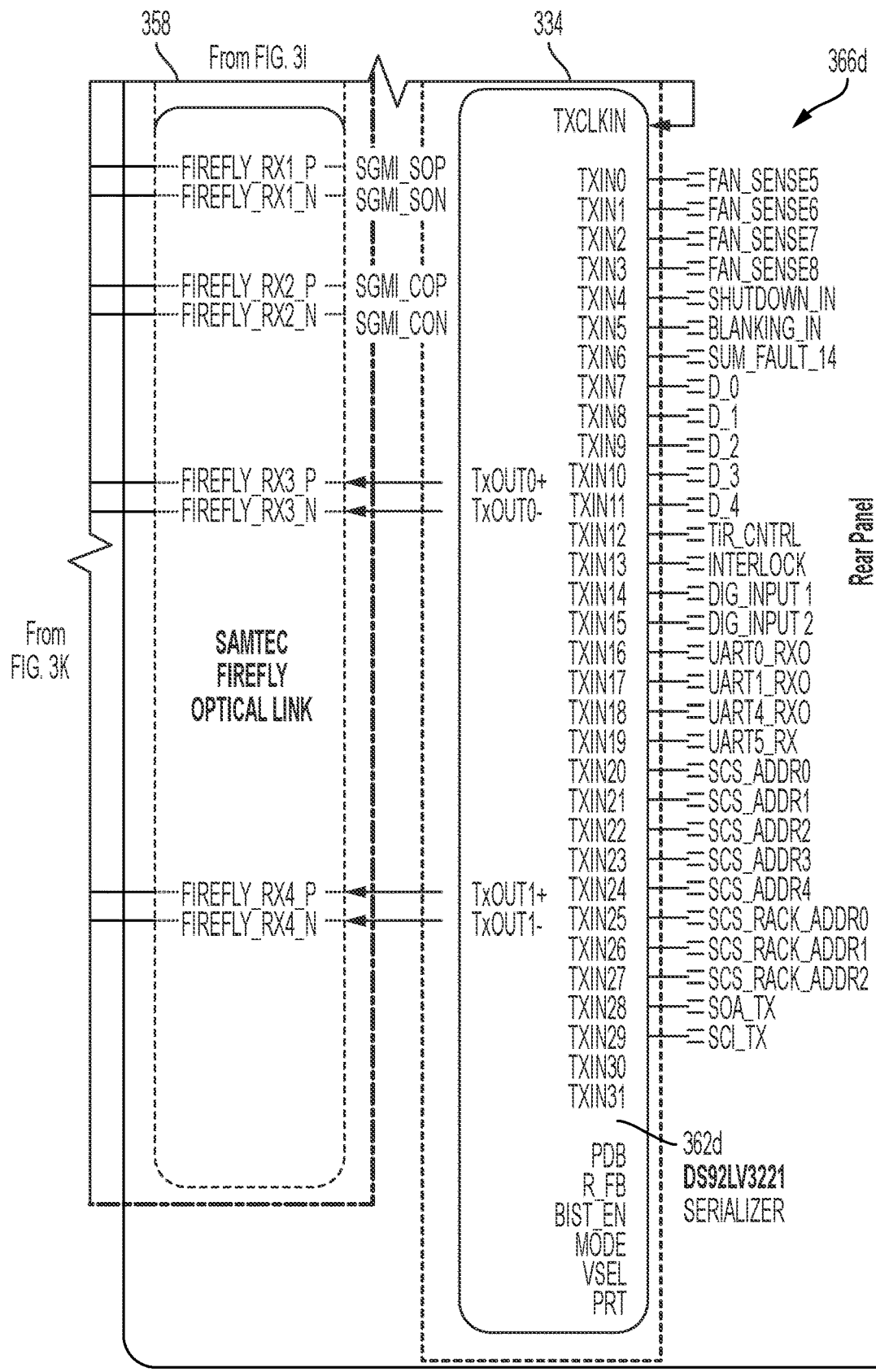
Figure 3M:
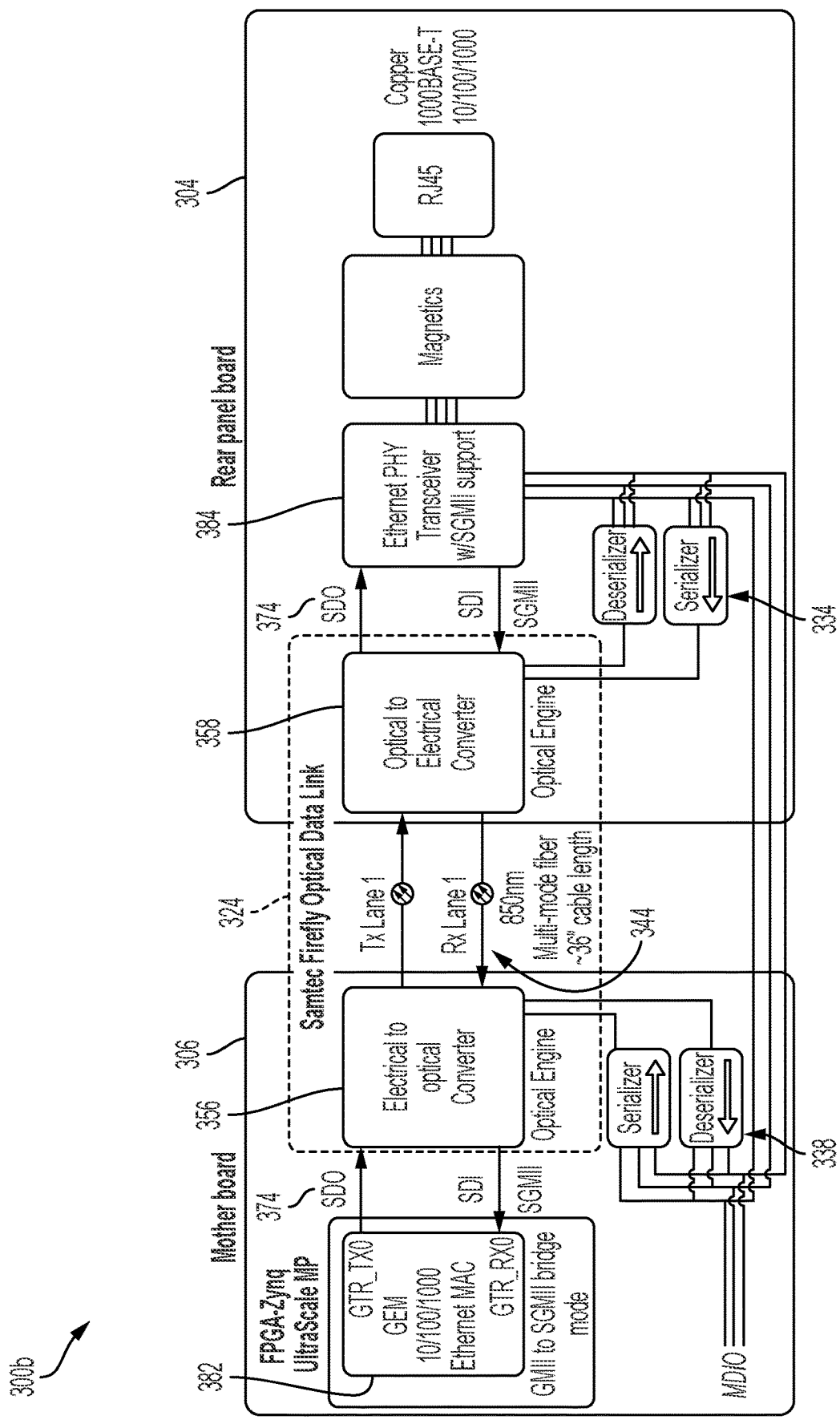

FIGS. 3A-3M are simplified diagrams of optical communication systems 300a and 300b according to some embodiments. FIGS. 3A-3F show a schematic diagram of optical communication system 300a, FIGS. 3G-3L shows a schematic diagram of optical communication system 300b, and FIG. 3M shows a corresponding block diagram of optical communication system 300b.

In some embodiments, optical communication systems 300a and 300b may be used to implement optical links 222 and 224 and their corresponding optical interfaces 232-238. Referring to FIGS. 3A-3F, optical communication system 300a connects a controller 306 (e.g., controller 206) to a front panel 302 (e.g., front panel 202) via an optical link 322 (e.g., optical link 222). Referring to FIGS. 3G-3M, optical communication system 300b connects controller 306 to a rear panel 304 (e.g., rear panel 204) via an optical link 324 (e.g., optical link 224). In some embodiments, optical links 322 and 324 can communicate with components of front panel 302, rear panel 304, and controller 306 via optical interfaces 332-338 (e.g., optical interfaces 232-238).

Referring to FIGS. 3A-3F, optical link 322 includes an optical fiber 342 that extends between controller 306 and front panel 302. Similarly, referring to FIGS. 3G-3M, optical link 324 includes an optical fiber 344 that extends between controller 306 and rear panel 304. In some embodiments, optical fibers 342 and 344 may be multi-mode fibers (e.g., 850 nm multi-mode fibers).

Referring to FIGS. 3A-3F, optical link 322 further includes a pair of optical engines 352 and 354 located at each end of optical fiber 342. Similarly, referring to FIGS. 3G-3M, optical link 324 includes a pair of optical engines 356 and 358 located at each end of optical fiber 344. In some embodiments, optical engines 352-358 may perform electrical-to-optical and optical-to-electrical conversion during transmission of signals over optical fibers 342 and 344. Optical engines 352-358 may further perform multiplexing techniques (e.g., time division multiplexing (TDM), wavelength division multiplexing (WDM), or the like) to provide one or more communication lanes 360. For example, communication lanes 360 can include transmit (TX) lanes, receive (RX) lanes, bidirectional lanes, or the like. In some embodiments, each of communication lanes 360 may include a positive (P) and negative (N) signal. As illustrated in FIGS. 3A-3L, each of optical engines 352-358 provides four RX communication lanes and four TX communication lanes.

In some embodiments, optical interfaces 332-368 may include pairs of serializers 362a-d and deserializers 364a-d to enable communication from multiple components over a single optical fiber. For example, referring to FIGS. 3A-3F, serializer 362a and deserializer 364a may enable a plurality of signals 366a to be transmitted from controller 306 to front panel 302 over optical link 322. As illustrated in FIGS. 3A-3F, signals 366a include a fan control signal (FAN_CNTRL), a fan on/of signal (FAN_ON_OFF), a transmit LED signal (TX_LED), an alert LED signal (ALERT_LED), a logo LED signal (LOGO_LED), a power LED signal (POWER_LED), and audio alert signal (AUDIO_ALERT), DisplayPort auxiliary channel signals (DP_AUX_OE and DP_AUX_OUT), a UART transmit signal (UARTS_TX), and touch display interface signals (TOUCH_SPI_CLK, TOUCH_SPI_MOSI_CLK, and TOUCH_CS).

Similarly, still referring to FIGS. 3A-3F, serializer 362b and deserializer 364b may enable a plurality of signals 366b to be transmitted from front panel 302 to controller 306 over optical link 322. As illustrated in FIGS. 3A-3F, signals 366b include a set of fan sense signals (FAN_SENSE1, FAN_SENSE2, FAN_SENSE3, and FAN_SENSE4), DisplayPort auxiliary channel signals (DP_AUX_IN and DP_AUX_HPD), a UART receive signal (UARTS_RX), and touch display interface signals (TOUCH_PIRQ and TOUCH_SPI_MISQ_DOUT).

In like manner, referring to FIGS. 3G-3L, serializer 362c and deserializer 364c may enable a plurality of signals 366c to be transmitted from controller 306 to rear panel 304 over optical link 324. Similarly, serializer 362d and deserializer 364d may enable a plurality of signals 366d to be transmitted from rear panel 304 to controller 306 over optical link 324.

In some embodiments, one or more signals may be transmitted directly over optical links 322 and 324, bypassing optical interfaces 332-338. Such signals may be transmitted via dedicated communication lanes on optical links 322 and 324. For example, as illustrated in FIGS. 3A-3F, one or more signals 372 (e.g., DisplayPort signals) are transmitted directly over optical link 322 via dedicated lanes among communication lanes 360. Similarly, in FIGS. 3G-3M, one or more signals 374 (e.g., SGMII signals) are transmitted directly over optical link 324 via dedicated lanes among communication lanes 360.

Figure 4:
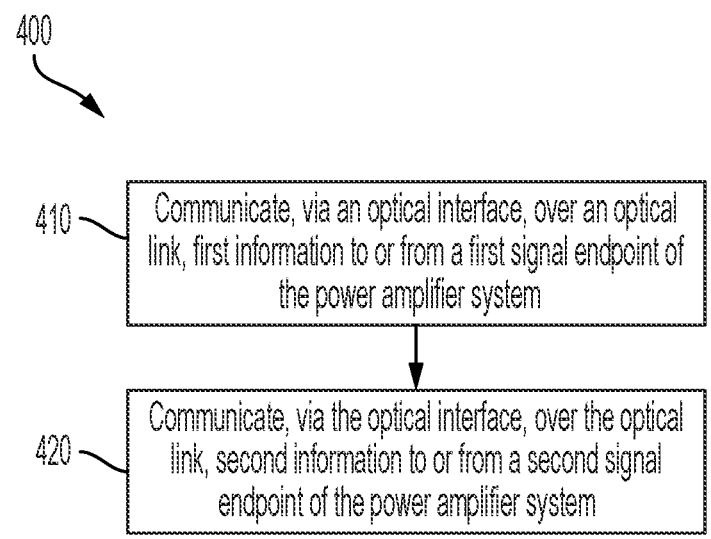
FIG. 4 is a simplified diagram of a method for communicating over an optical link in a power amplifier system.

As illustrated in FIG. 3M, the SGMII signals 374 connect directly between optical engine 352 and a processor 382 (e.g., processor 208b), bypassing optical interface 338. Similarly, the SGMII signals 374 connect directly between optical engine 356 and an Ethernet transceiver 384, bypassing optical interface 334. FIG. 4 is a simplified diagram of a method 400 for communicating over an optical link in a power amplifier system. In some embodiments, method 400 may be implemented by controller 206.

At a process 410, first information is communicated, via an optical interface (e.g., optical interface 236), over an optical link (e.g., optical link 222), to or from a first signal endpoint (e.g., signal endpoint 211) of the power amplifier system. The first information may be transmitted by the controller and received by the first signal endpoint, transmitted by the first signal endpoint and received by the controller, or both (e.g., bidirectional communication). In some embodiments, the optical interface may be a SerDes interface. The use of a SerDes interface may allow the first information to be communicated over a single fiber optic line, even where an analogous transmission over an electrical cable would use multiple parallel interconnects to communicate the first information. For example, for the embodiment of FIGS. 2A-2D, process 410 can be implemented by controller 206. Similarly, for the embodiment of FIGS. 3A-3M, process 410 can be implemented by controller 306.

At a process 420, second information is communicated, via the optical interface, over the optical link, between the controller a second signal endpoint (e.g., signal endpoint 212) of the power amplifier system. Here, the use of the optical interface (e.g., a SerDes interface) may allow the second information to be communicated over the same fiber optic line used to transmit the first information, even where analogous transmissions over electrical cables would use different cables to communicate the first information and the second information. For example, for the embodiment of FIGS. 2A-2D, process 420 can be implemented by controller 206. Similarly, for the embodiment of FIGS. 3A-3M, process 420 can be implemented by controller 306.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A power amplifier system comprising:
a plurality of electronic components each coupled to a first optical interface;
an optical link coupled to the first optical interface;

a controller coupled to the optical link via a second optical interface, the controller communicating with each of the plurality of electronic components over the optical link; and an electrical interconnect providing a communication link between each of the plurality of electronic components and the controller.

2. The power amplifier of claim 1, wherein the first optical interface and the second optical interface are serializer/deserializer (SerDes) interfaces.

3. The power amplifier of claim 1, further comprising a radio frequency (RF) circuit that produces electromagnetic interference (EMI) within the power amplifier system.

4. The power amplifier system of claim 1, wherein the plurality of electronic components include at least one of an input/output interface, an Ethernet interface, a device configured to receive commands, a device configured to receive control signals, a device that generates status information, a display port, a status indicator, a touch screen display, a peripheral interface controller, or a fan.

5. The power amplifier system of claim 1, wherein the plurality of electronic components are mounted to an enclosure of the power amplifier system.

6. The power amplifier system of claim 1, wherein the controller communicates over the optical link using pulse-width modulation (PWM) control signals.

7. The power amplifier system of claim 1, wherein the electrical interconnect provides a contingency route for the controller to communicate with each of the plurality of electronic components, the contingency route being used in response to determining that the optical link is unavailable.

8. The power amplifier system of claim 1, wherein the controller comprises a motherboard of the power amplifier system.

9. The power amplifier of claim 1, wherein the optical link comprises a multi-mode fiber.

10. The power amplifier of claim 1, wherein the controller further comprises an electrical-to-optical engine and an optical-to-electrical engine, wherein the electrical-to-optical engine and the optical-to-electrical engine each perform multiplexing to provide one or more communication lanes over the optical link.

11. The power amplifier of claim 10, wherein the one or more communication lanes include at least one of a transmit lane, a receive lane, or a bidirectional lane.

12. The power amplifier of claim 10, wherein the one or more communication lanes include at least one dedicated communication lane that bypasses the second optical interface.

13. The power amplifier of claim 1, wherein the electrical interconnect supplies power (i) one or more of the plurality of electronic components, (ii) the controller, or (iii) one or more of the plurality of electronic components and the controller.

14. A method for communicating in a power amplifier system comprising:

communicating, by a controller of the power amplifier system, via an optical interface, over an optical link, first information to or from a first electronic component of the power amplifier system;

communicating, by the controller, via the optical interface, over the optical link, second information to or from a second electronic component of the power amplifier system; and communicating, by the controller, over an electrical interconnect, third information to or from the first electronic component or the second electronic component in response to determining that the optical link is unavailable.

15. The method of claim 14, wherein the optical interface is a serializer/deserializer (SerDes) interface.

16. The method of claim 14, further comprising multiplexing the first information and the second information to provide one or more communication lanes over the optical link.

17. The method of claim 16, wherein the one or more communication lanes include at last one dedicated communication lane that bypasses a second optical interface, and wherein at least one of the first information and the second information is communicated over the dedicated communication lane.

18. A power amplifier system comprising:

a plurality of electronic components each coupled to a first optical interface;

an optical link coupled to the first optical interface;

a controller coupled to the optical link via the second optical interface, the controller communicating with each of the plurality of electronic components over the optical link; and an electrical-to-optical engine and an optical-to-electrical engine, the electrical-to-optical engine and the optical-to-electrical engine performing multiplexing to provide one or more communication lanes over the optical link including a dedicated communication lane that bypasses the second optical interface.

19. The power amplifier system of claim 18, wherein the controller communicates over the optical link using pulse-width modulation (PWM) control signals.

20. The power amplifier of claim 19, wherein the first optical interface and the second optical interface are serializer/deserializer (SerDes) interfaces.

* * * * *